United States Patent Office 3,153,092
Patented Oct. 13, 1964

3,153,092
1-METHYL-2-PHENYLCYCLOPROPYLAMINE DERIVATIVES
Alfred Burger, Charlottesville, Va., assignor to Smith Kline & French Laboratories, Philadelphia, Pa., a corporation of Pennsylvania
No Drawing. Filed July 17, 1961, Ser. No. 124,398
4 Claims. (Cl. 260—570.5)

This invention relates to novel phenylcyclopropylamine derivatives having advantageous pharmacodynamic utility. More specifically, this invention relates to 1-methyl-2-phenylcyclopropylamines having a novel combination of anorectic and antidepressant actiivty.

The compounds of this invention are represented by the following structural formula:

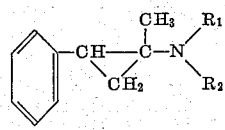

Formula I in which $R_1$ and $R_2$ are hydrogen and methyl.

The compounds represented by Formula I above, and especially 1-methyl-2-phenylcyclopropylamine, are pharmacologically unique in that they combine in one molecule the anorectic properties of amphetamine (2-phenylisopropylamine) and the antidepressant properties of tranylcypromine (2-phenylcyclopropylamine). The antidepressant activity is measured as a function of the inhibition of the enzyme monoamine oxidase.

The fact that the compounds of this invention have any action on the inhibition of monoamine oxidase is entirely unexpected from the prior art. Zeller et al., Helvetica Chimica Acta 43 (1), 439–447 (1960), in a review article on the "Action of 2-Phenylcyclopropylamines on Monoamine Oxidase and Other Enzyme Systems," conclude on page 447 that an α-hydrogen atom with respect to the amino group is essential to monoamine oxidase inhibition activity. The novel compounds of this invention which lack an α-hydrogen atom but are potent monoamine oxidase inhibitors disprove this theory.

A further distinguishing factor contributing to the unexpected novelty of the compounds of this invention is that of the three possible 2-phenylcyclopropylamine derivatives with a methyl substituent on the cyclopropane ring (i.e. 1-methyl, 2-methyl or 3-methyl), the 2- and 3-methyl derivatives are completely devoid of monoamine oxidase inhibitory activity at doses which the 1-methyl derivative is a potent inhibitor, as measured by tryptamine potentiation in rats.

This invention also includes acid addition salts of the above defined bases formed with non-toxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, cyclohexyl sulfamic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halothiophyllines, for example 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention may be present as cis-trans isomers due to the geometrical arrangement of the 2-substituent and the amino moiety with respect to the cyclopropane ring and further as d,l optical isomers. Unless otherwise specified in the specification and the accompanying claims, it is intended to include all isomers, particularly the separated cis or trans isomers and the resolved d- or l-cis or d- and l-trans isomers, as well as the cis-trans mixtures of these isomers.

The novel phenylcyclopropylamines of this invention are prepared according to the following synthetic scheme:

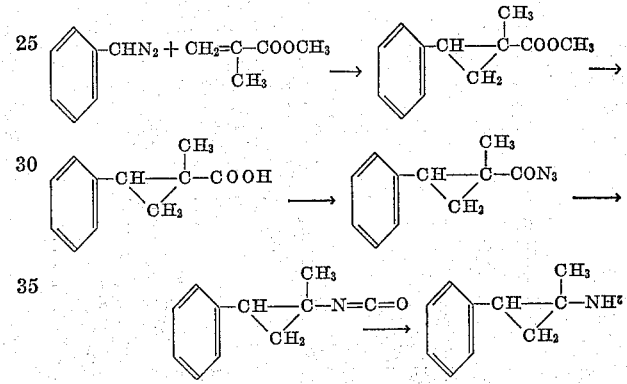

The methyl methacrylate or other lower alkyl methacrylate is reacted with phenyldiazomethane in an inert organic solvent such as ether at a temperature in the range of from −5° C. to 10° C. to give a mixture of the cis-trans isomeric phenylcyclopropanecarboxylates. Advantageously, a small amount of hydroquinone is employed in this step as a stabilizer. These esters are saponified by refluxing with an aqueous alcoholic solution of an alkali metal hydroxide such as potassium or sodium hydroxide to give the corresponding phenylcyclopropanecarboxylic acids.

The separated cis and trans phenylcyclopropanecarboxylic acids are obtained either by fractional distillation under reduced pressure of the lower alkyl carboxylate mixture followed by saponification of the separated esters or by fractional recrystallization of the free carboxylic acid mixture.

The cis-trans mixture of phenylcyclopropanecarboxylic acids or the separated cis or trans acids is further treated as follows. The acid is reacted with a lower alkyl haloformate, preferably ethyl chloroformate, to give the corresponding phenylcyclopropyl mixed anhydride. Advantageously the carboxylic acid is suspended in water and a sufficient amount of a water miscible organic solvent such as dioxane, dimethylformamide or preferably acetone to complete solution, and the solution is cooled to from −10° C. to about 10° C. The lower alkyl haloformate is added and the mixture stirred for from 15 to 90 minutes. The reaction is preferably run in the presence of an organic base such as triethylamine or pyridine.

The mixed anhydride thus formed is then treated with an aqueous solution of sodium azide, advantageously in situ, at from −5° C. to about 10° C. The reaction mixture is stirred for from 30 minutes to three hours and then treated with ice water. The phenylcyclopropyl acid azide is extracted with a water immiscible organic solvent, for example ether.

The azide is then subjected to the general reaction conditions employed in the Curtius rearrangement, namely refluxing in an unreactive organic solvent, for example toluene, for several hours to yield the isocyanate. This latter compound is refluxed in a hydrochloric acid solution, made basic and extracted with ether to give the desired phenylcyclopropylamine free base.

The N-monomethylamino derivatives of Formula I above are prepared from the corresponding N-formylamino derivatives prepared from the primary amine by refluxing with ethyl formate. The N-formylamino derivative is converted to the sodio derivative which is alkylated with methyl iodide. The N-formyl-N-methylamine is then hydrolyzed in hydrochloric acid solution to give the N-monomethylamine. The dimethylamino derivatives are obtained by methylation of the primary amine with a mixture of aqueous formaldehyde and formic acid.

The foregoing is a general description of the main synthetic routes in the preparation of the phenylcyclopropylamines of this invention. It will be readily apparent to one skilled in the art that variations of these procedures are possible.

The following examples are not limiting but are illustrative of compounds of this invention and the procedures for their preparation and will serve to make fully apparent all of the compounds embraced by the general Formula I above and the preparation thereof respectively.

*Example 1*

Freshly distilled methyl methacrylate (212 g.) is added to a solution of phenyldiazomethane (ca. 34 g.) in 1.5 l. of dry ether and hydroquinone (4 g.), over a period of one and one-half hours at 0–5° C. After standing for ten hours, the ether and excess methyl methacrylate are distilled under vacuum. The resulting oil is heated for an additional one and one-half hours at 120–135° C. under vacuum. The oil is distilled and the fraction distilling at 88–91°/3.0 mm. is the product, methyl 1-methyl-2-phenylcyclopropanecarboxylate.

The methyl carboxylate (32 g.) is dissolved in 200 ml. of ethanol and a solution of 40 g. of potassium hydroxide in 50 ml. of water. The solution is refluxed for 12–15 hours. After cooling, the ethanol and water is evaporated and the residue dissolved in water. The aqueous solution is extracted with ether; the aqueous layer is acidified with hydrochloric acid and extracted with ether. The combined and dried ethereal extract is concentrated and the residue is recrystallized from petroleum ether to give 1-methyl-2-phenylcyclopropanecarboxylic acid, M.P. 80–82° C.

A solution of 6.2 g. of 1-methyl-2-phenylcyclopropanecarboxylic acid in acetone (15 ml.) and water (7.5 ml.) is stirred and cooled (−5° C.). To this is added a solution of 4.05 g. of triethylamine in 30 ml. of acetone, followed by a solution of 4.35 g. of ethyl chloroformate in 10 ml. of acetone. After stirring the mixture for 30 minutes, keeping the temperature at −5 to 0° C. throughout, a solution of 3.25 g. of sodium azide in 20 ml. of water is added to the mixed anhydride, and the stirring is continued for an additional two hours. The reaction mixture is then poured into an ice cold solution of sodium chloride (500 ml. of saturated solution and 250 ml. of ice water) and extracted with ether. The combined ethereal solutions are dried and evaporated at 30° C. under vacuum. A solution of the residual azide in 50 ml. of dry toluene is refluxed for two hours and then the solvent is removed. Eighteen percent hydrochloric acid (35 ml.) is added to the residue of the isocyanate and the mixture is refluxed for 18–20 hours. After cooling, the acidic mixture is extracted with ether, then basified with 10% sodium hydroxide solution and extracted with ether. The ethereal solutions are dried and concentrated. The residue is distilled to give 1-methyl-2-phenylcyclopropylamine, B.P. 60–61°/1.5 mm. The sulfate salt of the free base melts at 183–184° C.

*Example 2*

A 40% aqueous solution of formaldehyde (5.1 g.) is added to a cooled solution of 3.0 g. of 1-methyl-2-phenylcyclopropylamine (prepared as in Example 1) in 6.6 g. of 90% formic acid, and the mixture refluxed for 18 hours. The cooled reaction mixture is treated with 2.7 ml. of concentrated hydrochloric acid and the solution evaporated in vacuo. The residue is made alkaline with 50% potassium hydroxide solution and the solution extracted with ether. The dried ether extracts are evaporated to give the residual 1-methyl-2-phenylcyclopropyldimethylamine.

The free base dissolved in ethyl acetate is added to a solution of mandelic acid in ethanol. Concentration of the resulting solution and cooling yields the crystalline 1-methyl-2-phenylcyclopropyldimethylamine mandelate.

*Example 3*

A mixture of 35.1 g. of 1-methyl-2-phenylcyclopropylamine (prepared as in Example 1) and 165 ml. of ethyl formate is refluxed for 18 hours on the steam bath. The solvents are removed in vacuo to give the residual 1-methyl-2-phenyl-N-formylcyclopropylamine.

A solution of 38.0 g. of the N-formyl compound in 300 ml. of dry diethylene glycol dimethyl ether is stirred under an atmosphere of nitrogen. A suspension of 10.4 g. of sodium hydride (54.5%) in mineral oil is added and the mixture is stirred and refluxed gently for two hours. After cooling an additional 5.2 g. of sodium hydride suspension is added and refluxing continued for one and one-half hours. The mixture is cooled and 134.5 ml. of methyl iodide is added. After standing at room temperature for about 18 hours, a Dry Ice/isopropanol cooled condenser is attached and refluxing continued for eight hours. After standing 72 hours at room temperature, an additional 40 ml. of methyl iodide is added and refluxing and stirring continued for four hours. The mixture is filtered and the filtrate is concentrated to 200 ml. The residual oil is poured into ice water and extracted with methylene chloride. The dried extract is evaporated to give 1-methyl-2-phenyl-N-formyl-N-methylcyclopropylamine.

A mixture of 22.3 g. of the above amine, 200 ml. of concentrated hydrochloric acid and 90 ml. of water is stirred and refluxed for 20 hours. The mixture is extracted with ether and the aqueous layer is concentrated in vacuo. The residual oil is supended in 300 ml. of water and this mixture extracted with ether. The combined ether extracts are dried and evaporated to give 1-methyl-2-phenyl-N-methylcyclopropylamine.

A sample of the free base is dissolved in isopropanol and the solution made acid (pH ca. 1) with ethereal hydrogen chloride. The addition of ether precipitates the 1-methyl-2-phenyl-N-methylcyclopropylamine hydrochloride.

What is claimed is:

1. Chemical compounds selected from the group consisting of a free base of the formula:

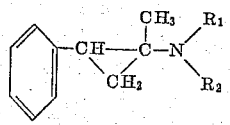

in which $R_1$ and $R_2$ are members selected from the group consisting of hydrogen and methyl, and salts with pharmaceutically acceptable acids.

2. A chemical compound of the formula:

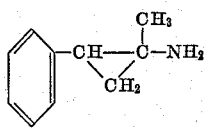

3. A chemical compound of the formula:

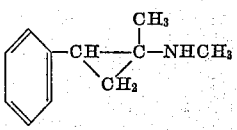

4. A chemical compound of the formula:

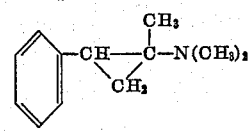

References Cited in the file of this patent
UNITED STATES PATENTS

| | | |
|---|---|---|
| 2,011,790 | Alles | Aug. 20, 1935 |
| 2,597,445 | Bruce et al. | May 20, 1952 |
| 2,653,977 | Craig et al. | Sept. 29, 1953 |
| 2,862,967 | Surrey | Dec. 2, 1958 |
| 2,997,422 | Tedeschi | Aug. 22, 1961 |
| 3,050,559 | Burger | Aug. 21, 1962 |
| 3,068,283 | Kaiser et al. | Dec. 11, 1962 |